Feb. 3, 1959  H. W. WALTERS  2,871,619
CONSTRUCTION KIT FOR MODEL BUILDINGS
Filed Sept. 9, 1957  6 Sheets-Sheet 1

INVENTOR.
HARRY W. WALTERS
BY Owen + Owen
ATTORNEYS

INVENTOR.
HARRY W. WALTERS

Feb. 3, 1959        H. W. WALTERS        2,871,619
CONSTRUCTION KIT FOR MODEL BUILDINGS
Filed Sept. 9, 1957        6 Sheets-Sheet 4

INVENTOR.
HARRY W. WALTERS
BY
Owen + Owen
ATTORNEYS

Feb. 3, 1959 H. W. WALTERS 2,871,619
CONSTRUCTION KIT FOR MODEL BUILDINGS
Filed Sept. 9, 1957 6 Sheets-Sheet 5

INVENTOR.
HARRY W. WALTERS
BY Owen + Owen
ATTORNEYS

Feb. 3, 1959 H. W. WALTERS 2,871,619
CONSTRUCTION KIT FOR MODEL BUILDINGS
Filed Sept. 9, 1957 6 Sheets-Sheet 6

INVENTOR.
HARRY W. WALTERS
BY
ATTORNEYS

United States Patent Office 2,871,619
Patented Feb. 3, 1959

2,871,619

CONSTRUCTION KIT FOR MODEL BUILDINGS

Harry W. Walters, Edinboro, Pa.

Application September 9, 1957, Serial No. 682,713

10 Claims. (Cl. 46—19)

This invention relates to a construction kit for model houses and buildings and to a method for erecting such models; the kit including plans, forms and materials for laying out the floor plan, erecting walls, forming windows, doors and other openings, fabricating gables, roofs, etc.; and the method including the manner in which these various component parts of the model building are constructed and assembled.

It is the principal object of this invention to provide a construction kit for model buildings and a method for their assembly which is so designed as to permit a person employing the kit to fabricate buildings of different types and styles utilizing the same basic construction materials for all of the various types of buildings regardless of their particular sizes and designs.

To this end a construction kit embodying the invention includes standard or modular sections for the erection of pouring forms so that a person desiring to build one or another of the model houses may assemble these modular forms in any desired configuration or shape and after assembly be able to pour a house whose walls, windows, doors, roofs, etc. will be determined by the particular plan in which the modular mold elements are initially assembled.

The invention also includes the concept that the same modular form elements may be used for constructing many different sizes and styles of houses; each being based upon multiples of the basic form size.

The flexibility provided by and the manner of use of the modular structural elements will be better understood from the specification which follows and from the appended drawings which illustrate the use of modular elements designed according to the invention for the construction of an exemplary house. In these drawings.

For the purposes of illustration of the elements making up the construction kit embodying the invention and the method of the invention whereby they may be utilized for the construction of model buildings, a single simple house will be described. The selection of a particular shape or size of house utilizing, as the exemplary house does, only a few inner partitions and a very simple roof structure, it not intended to place any limitation upon the size, design or complications of buildings which may be constructed with kits embodying the invention and according to the method of the invention.

Figure 1:
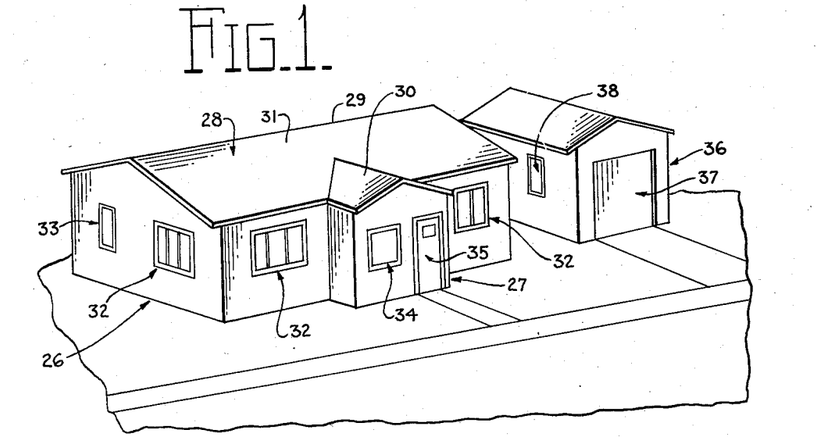
Figure 1 is an isometric view of a model of a small single floor or "ranch type" house and including a single car garage poured by the utilization of a construction kit embodying the invention and according to the invention.

The house selected to be described, as shown in Fig. 1, consists of a main rectangular portion generally indicated by the reference number 26 and a small, forwardly protruding, vestibule generally indicated by the reference number 27. The main portion 26 of the house has a simple two part roof generally indicated at 28 and having a longitudinally extending ridge 29. The vestibule section 27 is roofed with a similar simple roof 30 joined at its rear to the main roof 28 as a gable protruding forwardly from a front piece 31 of the roof 28. In the front and side walls of the house 26 there are shown two triple pane front windows 32, and a pair of end windows, including a triple pane window 32 and a single pane window 33. The vestibule 27 is illustrated as having a single pane window 34 and a front door 35.

In Fig. 1 there is also shown a simple, single car garage, generally indicated at 36 and having a main door 37 and window 38. The following description will not include a detailed description of the construction of the garage because its details of construction will vary from those of the house itself only in the size of the various elements, fabricated according to the invention and assembled according to a suitable garage floor plan.

Figure 2:
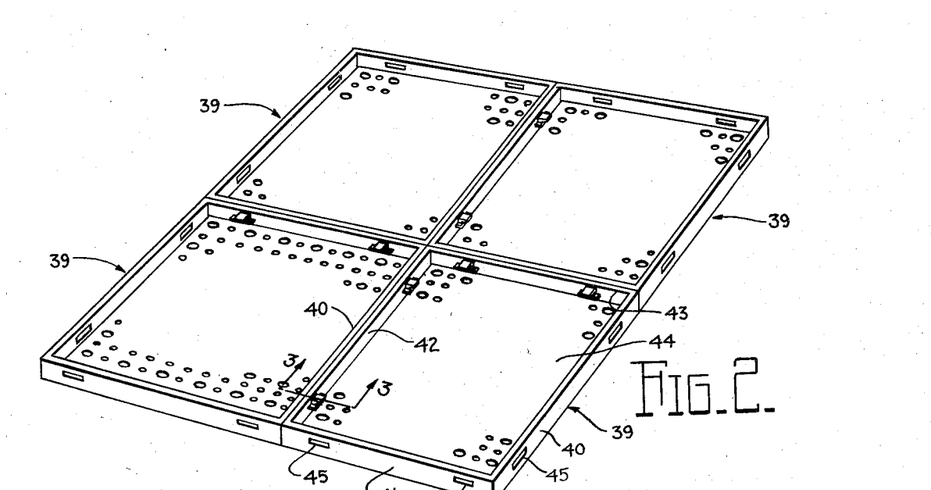
Fig. 2 is an isometric view of a plurality of modular construction bases assembled to each other and shown in inverted position, i. e., with their bottom surfaces up to illustrate the manner in which the several construction bases are assembled to each other.

In Fig. 2 there are shown four construction bases 39. Each of the construction bases 39 is identical with all other ones of the construction bases 39 and each of them has such lateral dimensions as will cooperate with the modular wall forms to be later described for the erection of model houses, garages and other buildings of standard multiplications of those modular sizes.

Figure 3:
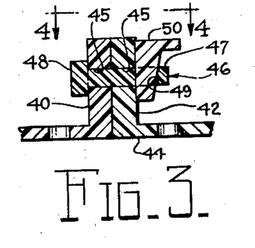
Fig. 3 is a greatly enlarged, fragmentary, vertical sectional view taken along the line 3—3 of Fig. 2 and illustrating the manner of assembly of the construction bases one to the other.
Figure 4:
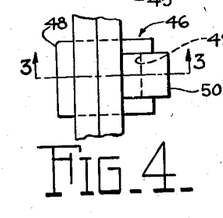
Fig. 4 is a fragmentary plan view taken from the position indicated by the line 4—4 of Fig. 3.

Each of the construction bases 39 is a unitary molded part having a four downwardly turned flanges 40, 41, 42 and 43 and a perforated base plate 44. Each of the flanges 40—43 is slotted, with the slots in all of the construction bases 39 being spaced similarly so that when a plurality of the bases 39 are assembled adjacent each other the respective slots 45 are aligned with each other. As can best be seen by referring to Figs. 3 and 4 the bases 39 may be assembled together to form a single base for the erection of houses or other buildings which are larger than one of the bases 39. The bases 39 are held in assembled relationship by locking pins 46 which are inserted laterally through the slots 45 in the adjacent flanges, say 40 and 42 of a pair of the bases 39. The locking pins 46 have generally rectangular shanks 47 which snugly fit through the slots 45, enlarged heads 48 and tapered slots 49 through their shanks 47 for the reception of tapered wedges 50. Of course, the number of bases 39 assembled will be determined by the floor plan of the particular house to be constructed.

Figures 5, 10, 11, 12:
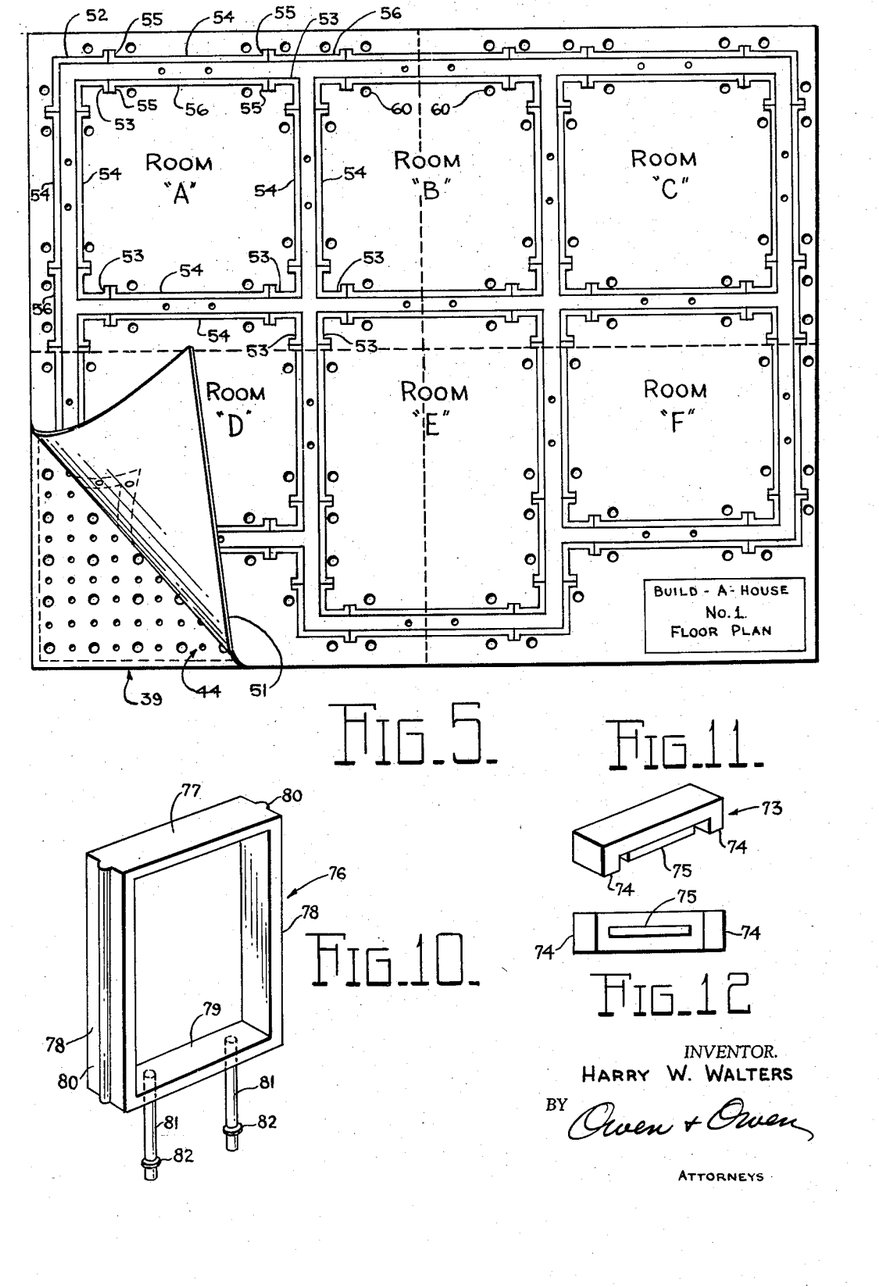
Fig. 5 is a view generally in plan but showing a portion of a house floor plan in perspective, and illustrating how a floor and wall plan for the particular house to be constructed is placed upon the upper face of a plurality of construction bases after they have been assembled as illustrated in Figs. 2–4.
Fig. 10 is an isometric view of a window frame intended to be inserted in a wall being constructed according to the invention and to provide an opening for a window therein.
Fig. 11 is an isometric view on a further enlarged scale and showing a wall form brace.
Fig. 12 is an inverted plan view of the brace shown in Fig. 11.

In Fig. 5, a floor plan, generally indicated at 51, is shown overlying the base plates 44 of four of the bases 39. The mating edges of the four bases 39 are indicated in Fig. 5 by two broken lines perpendicular to each other and crossing each other at the center of the figure. In that portion of the base plate 44 at the lower left corner of Fig. 5 which is revealed by a turned up corner of the floor plan 51, it can be seen that the base plate 44 is perforated in a reticulated pattern with holes of two different sizes. Alternate rows, both horizontally and vertically consist of alternating large and small holes whereas the intervening rows both horizontally and vertically consist exclusively of the smaller holes. The spacing of the reticulated pattern made by the plurality of holes molded in the base plate 44 is determined by a standard unit of distance between the centers of the alternating large holes. The small holes are spaced midway between the large holes, both horizontally and vertically. The rows of holes bordering the edges of the plates 44 are large holes and are spaced from those edges one-half of the standard unit of distance. Thus when the construction bases 39 are assembled adjacent each other, it is the same distance from the center of a large hole in an edge row of one base plate 44 to the center of a large hole in the edge row of adjacent base plate 44, as it is between the centers of large holes on a row on one of the plates 44.

The floor plan 51 is a printed plan designed for a particular house, in Fig. 5 the plan shown being for the house shown in Fig. 1. This plan requires the construction of six individual rooms. In Fig. 5 these rooms are indicated by the legends "Room A," "Room B," "Room C," "Room D," "Room E" and "Room F." Each of the rooms "A–F" is defined by the usual outer walls and inner partitions and its size is, of course, determined by the number of modular forms used for the construction of the outer walls of the house and the placement of the partition walls in the interior of the house.

For example, referring to the upper left hand corner of Fig. 5, that the outside corner of "Room A" which is also an outside corner of the house is delineated by an outside corner form 52 and a complementary inside corner form 53. The continuing walls are made by a full size wall form 54 turned with its mounting flange 55 extending outwardly, and a cooperating full size wall form 56 turned with its mounting flange 55, extending inwardly.

At each of the corners of "Room A" the plan shows an inside corner form 53. Each of the walls of "Room A" is formed by a pair of inwardly and outwardly turned full size wall forms 54. At the corners of "Room A" where an outside wall meets a partition wall, the outside wall is continued straight by a half size wall form 56. A half size wall form 56, when opposed by two of the inside corner forms 53 delineates a T made by a partition abutting against a straight outside wall.

At the inner corner of "Room A," where two partitions meet four inside corner forms 53 are positioned to delineate a cross.

The floor plan 51 is printed on a sheet of paper, preferably water-proof, and translucent. The plan 51 is perforated with both large and small holes spaced according to the modular distance and for the reception of locating pins (see below) on the various wall forms and other forms drawn on the plan 51.

Figures 6, 7, 8, 9:
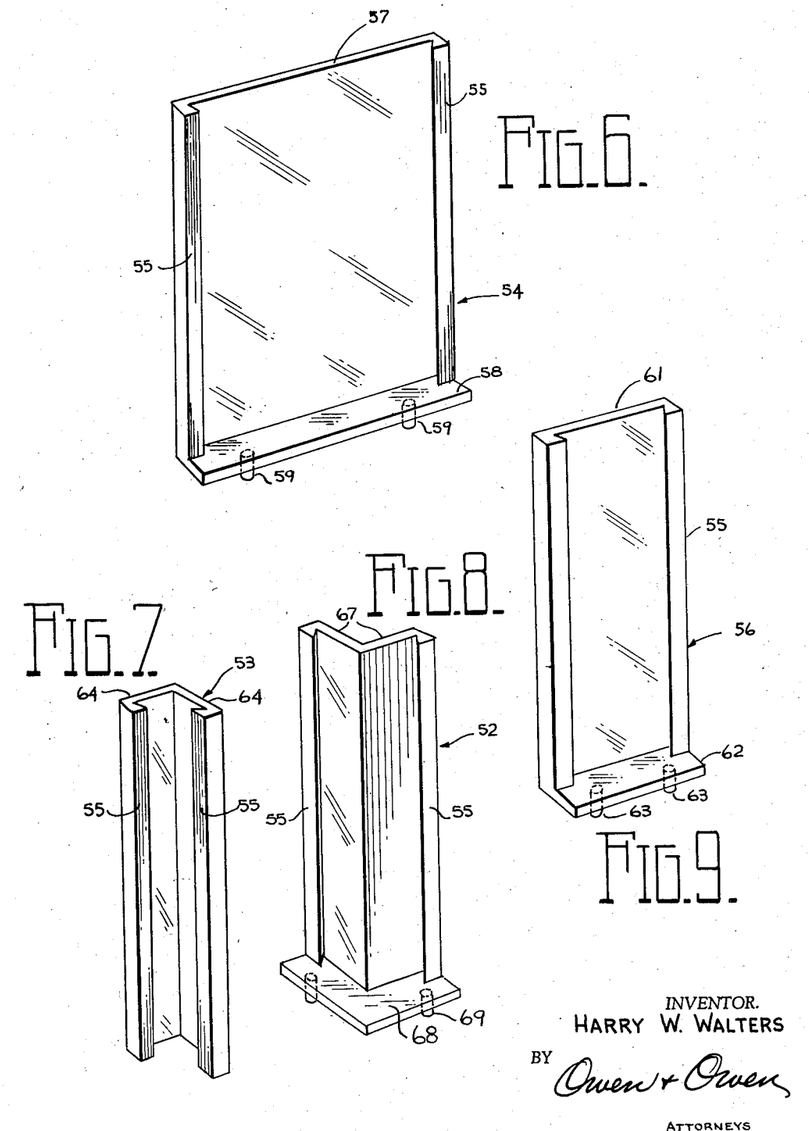
Fig. 6 is a view in perspective of a full section wall form.
Fig. 7 is a view similar to Fig. 6 but showing an inside corner wall form.
Fig. 8 is a view similar to Fig. 7 but showing an outside corner wall form.
Fig. 9 is a view similar to Fig. 6 but showing a half-size wall form.

Fig. 6, is an isometric view of a full size wall form 54. The form 54 comprises a flat vertical sheet 57 having a pair of wedge shaped side flanges 55 and a base flange 58. Two locating pins 59 protrude downwardly from the underside of the base flange 58 and are spaced from each other a distance equal to a multiple of the basic distance upon which the series of holes in the base plates 44 are drilled.

In the embodiment of the invention herein shown and described, a full size wall form 54 has an overall length equal to 4 times the modular distance. The locating pins are spaced three spaces apart and the form extends ½ space beyond the pins at each end. Perforations in the floor plan 51, for example, perforations number 60 in the upper wall of "Room B" which are intended for the reception of locating pins 59 of a form 54 are spaced from each other a distance corresponding three modular spaces. At any part of a wall where a full size wall form 54 is to be erected to form the main part of one of the walls of a room its locating pins 59 drop through corresponding perforations 60 in the floor plan 51 and into holes in the base plates 44.

Similarly each of the half size wall forms 56, one of which is shown in isometric projection in Fig. 9, has a flat vertical plate 61, at each edge of which there is located a vertically extending wedge shaped mating flange 55, and a base flange 62 similar to the base flange 58 of the full size wall form 54. The base flange 62 is provided with a pair of locating pins 63 which are spaced from each other a single modular distance and the half size form 54 is two modular lengths over all, extending one half space beyond the pins 63 at each end.

Fig. 7 is an isometric view of an inside corner form 53. The inside corner form 53 has a pair of narrow, flat vertical plates 64 which meet each other at a 90° angle and at the outer edges of which there are located vertically extending wedge-shaped mounting flanges 55. Unlike the wall forms 54 and 56 the inside corner forms 53 have no base flange because they are small in size and will be retained in place by retainer clips to be described below.

In Fig. 8 there is illustrated an outside corner form 52 which consists of a pair of flat vertical plates 67 also meeting at right angles on their vertical joining edge, but wider than and complementary to the inside corner form 53. The plates 67 have wedge-shaped mounting flanges 55 at the outsides of their free edges rather than at the insides as in the plates 64 of the inside corner forms 53. The outside corner form 53 has an outside base flange 68 forming two arms, each having a locating pin 69. Each of the pins 69 is spaced a half modular space from the end of its respective arm and a full modular space from the point of intersection of center lines of the arms of the flange 68 at the outside of the corner.

As can be seen by reference to the Figs. 6, 7, 8 and 9, the main plates 57, 67, 64 and 61 of these various wall forms 54, 53, 52 and 56, respectively, are preferably fabricated from transparent material, such as methylmethacrylate or similar plastic material, which is not affected by water or the other constituents of the plaster or cement-like substance from which the house is to be poured.

Figure 13:
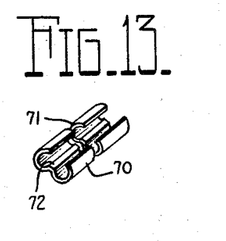
Fig. 13 is a fragmentary isometric view of a form holding clip.
Figure 14:
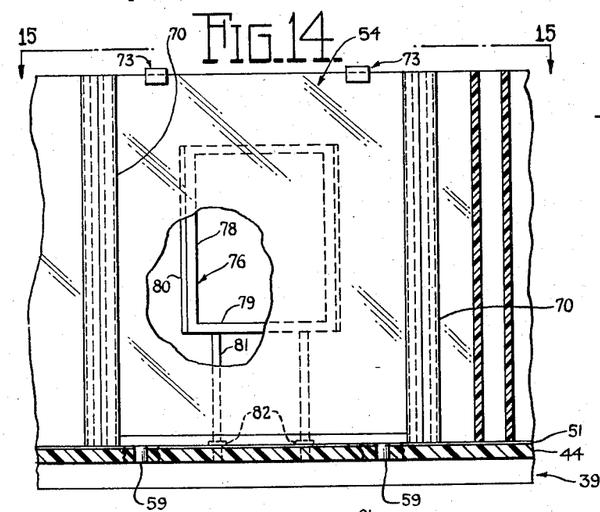
Fig. 14 is a fragmentary view in elevation, with parts broken away, and showing how a plurality of forms are assembled to each other and retained in place by form holding clips, for the erection of a wall; the section of the wall including a window opening and Fig. 14 including the showing of a window frame such as that illustrated in Fig. 10 in place.
Figure 15:
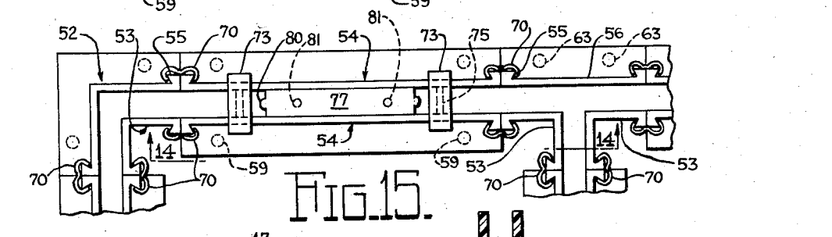
Fig. 15 is a fragmentary plan view of the wall section illustrated in Fig. 14 and taken from the position indicated by the line 15—15 of Fig. 14.

As the assembler erects the various wall forms upon the plan 51, he clips them to each other by the use of mounting clips such as the elongated generally bow-shaped clip 70 illustrated in Fig. 13. The mounting clip 70 is fabricated from a material having resilience so that its two wings 71 will tightly embrace a pair of the vertically extending, mounting flanges 55 of adjacent ones of the wall forms described. Referring to Figs. 14 and 15, it will be seen that in these fragmentary figures a pair of full size wall forms 54 is shown erected in position and clipped (at the right) to a half size wall form 56 and an inside corner wall form 53 and (at the left) to the fragmentarily shown ends of other wall forms, say an outside corner form 52 and another inside corner form 53. These several forms are assembled to form a rigid continuous pouring form in the mounting clips 70 shown in their position as embracing the vertical mounting flanges 55 of these wall forms.

As mentioned the mounting flanges 55 are wedge-shaped, having outwardly diverging walls so that the wings 71 of the clips 70 tightly embrace the flanges 55. Preferably each of the clips 70 also has a central ridge, indicated in Fig. 13 by the reference number 72, of such width and height as to be firmly forced into contact with the adjacent edges of the outer faces of a pair of the mounting flanges 55 when the wings 71 of the clip 70 are firmly seated around the pair of flanges 55. The clips 70 thus serve two functions: first, to assemble the wall forms in end-to-end or edge-to-edge relationship and second to hold the wall forms with their major plates lying in parallel planes.

By comparing Fig. 15 with Fig. 5, it is seen that when the wall forms are in place their plan configuration is identical with the plan view drawn upon the floor plan 51 leaving an open, horizontally continuous pouring space extending from the upper edges of the wall forms down to the floor plan 51 itself.

In Fig. 14 it can be seen how the retaining pins 59 of one of the full size wall forms 54 are inserted through perforations in the floor plan 51 and into the perforations in the perforated mounting plate 44. While the clips 70 retain the wall forms in general parallelism and the various retaining pins inserted in the perforations in the plate 44 position these wall forms laterally with respect to each other, it has been found advisable to utilize spacers to hold the wall forms into parallelism. Wall form spacers are illustrated in Figs. 11 and 12 and shown in use in Figs. 14 and 15. A wall form spacer 73 (Figs. 11 and 12) has a pair of downwardly turned end flanges 74 and a thin, centrally located spacing tongue 75, adapted to fit between and thereby to space the upper edges of parallel and opposed wall forms.

A window frame 76 (see Fig. 10) comprises a header 77, two opposed sides 78 and a sill 79. A vertically extending rib 80 is formed on the outer side of each of the sides 78. The window frame 76 is erected upon a pair of posts having enlarged stops 82, the posts 81 being centered in the sill 79 and so spaced from each other that the lower ends of the posts 81 fit into smaller perforations in the floor plan 51 and into corresponding smaller holes in perforated mounting plate 44. A window frame 76 is shown in place in Figs. 14 and 15. The various elements making up the window frame 76 are equal in thickness to the space between the opposed one of the wall forms. By thus emplacing a window frame 76 in a wall as indicated by the floor plan 51, at the position determined by its supporting posts 81 in the spaced perforations in the floor plan 51, an opening will be left in the finished wall after the wall is poured and the form elements are removed.

Figure 16:
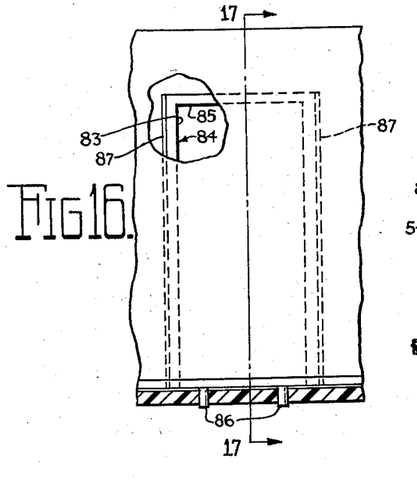
Fig. 16 is a fragmentary view in elevation, with parts broken away, of a wall form in place and illustrating how a door frame is emplaced between wall forms.
Figure 17:
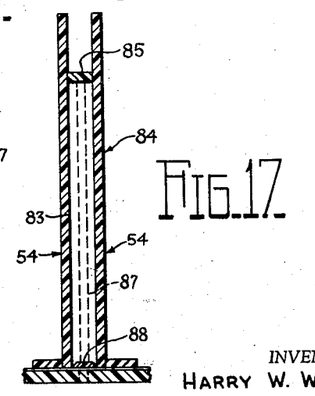
Fig. 17 is a fragmentary vertical sectional view taken along the lines 17—17 of Fig. 16.

Doors and other openings in the walls of a house to be constructed according to the invention are similarly formed through the use, for example, of door frames such as the door frame 83 illustrated in Figs. 16 and 17. Like the window frames 76 the door frames 83 have side members 84, headers 85, and positioning pins 86. Ribs 87 are molded on the outer sides of the side members 83. Each of the door frames 84 also has a door sill 88 suitably shaped in cross-section as shown in Fig. 17, so that after the walls are poured and the wall forms are removed, the sill 88 of the door frame will be seen in the finished house.

All similar frame members for doors and windows and other openings in the walls of the house to be constructed according to the invention are also equipped with side ribs. When cementitious material is poured between the wall forms it flows around the side ribs 80 or 87 firmly retaining the window or door frame 76 or 84, respectively, in the walls of the structure after the wall forms are removed.

In constructing a model house according to the invention, the constructor erects all of the various wall forms including both full and half size straight forms, inside and outside corner forms and the proper window and door frames in the positions indicated by the floor plan 51. After these various forms are positioned according to the floor plan 51, they are rigidly attached to each other by the clips 70 and the spacers 73.

Depending upon the nature of the cementitious construction material to be utilized and its adhesion to the material from which the forms are made, it may be necessary to paint over the interior surfaces of the various wall forms with a suitable releasing wax or coating substance, for example, one of the many silicone mold release compounds. The constructor then mixes up a quantity of the plaster or cementitious material from which the walls are to be poured and, fills the spaces between the forms until the spaces between the forms and around the window and door frames are completely filled with the pouring material. When the pouring material has hardened to a suitable consistency, say after the passage of several hours, the person erecting the house model disassembles the pouring forms by removing the mounting clips 70 and spacers 73, leaving the vertical walls and partitions with their window and door openings as the first portion of the model house to be constructed. After the walls and partitions of the house have been completely set up, the entire structure may be lifted off the construction bases 39 by freeing the edges of the floor plan 51 and using it as a lifting means.

Figure 18:
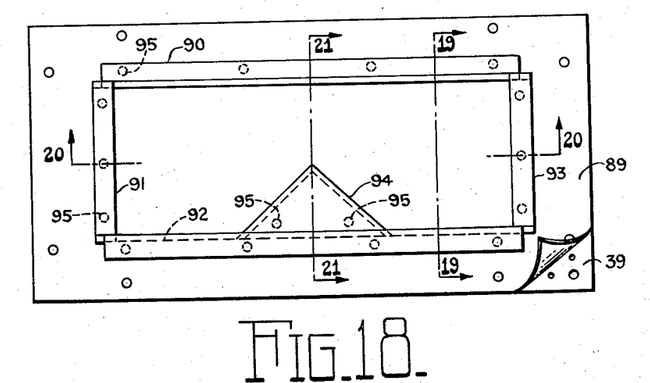
Fig. 18 is a plan view, on a smaller scale, illustrating how the construction bases which are employed for positioning the wall forms are also utilized in combination with a roof construction plan for the positioning of roof pouring forms.

The several construction bases 39 are then employed in assembled relationship for the pouring of elements of the roof for the finished house. In Fig. 18 there is shown a roof plan 89 for the positioning of roof pouring forms 90, 91, 92 and 93 and a gable forming insert 94. The forms 90–93 and insert 94 are of such shape and size as to provide for the pouring of both pieces of the roof 28, i. e., the front roof piece 31 and a plain back piece 31a. Each of the forms 90–93 and insert 94 has suitable positioning pins 95, perforations for which are punched in the roof plan 89 and which extend downwardly through such perforations into the larger holes in the several construction bases 39 upon which the roof plan 89 is positioned.

Figure 19:
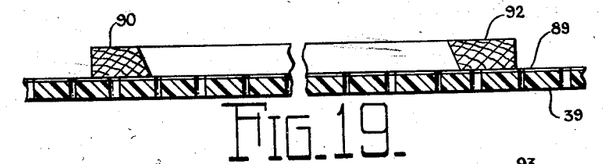
Fig. 19 is a greatly enlarged, fragmentary vertical sectional view taken along the line 19—19 of Fig. 18.
Figure 20:
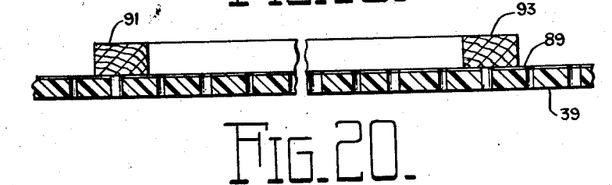
Fig. 20 is a view similar to Fig. 19 but taken along the line 20—20 of Fig. 18.

In order to provide for accurate mating of the edge of the roof piece 31 along the ridge 29 of the roof 28, the inner edge of the form 90 is outwardly beveled as shown in Fig. 19. Conversely the inner edge of the form 92 is undercut as shown in Fig. 19 in order that the front eave of the roof piece 31 or rear eave of the roof piece 31a will be vertical when the roof is placed on the house. The edges of the end forms 91 and 93 (see Fig. 20) are vertical and perpendicular to the plane of the major surfaces of the roof pieces 31 and 31a.

When the forms 90–93 are correctly positioned according to the plan 89 the house constructor pours a quantity of the cementitious material into the enclosure thus formed, leveling off this material by striking across the upper surfaces of the forms 90–93. When this cementitious material hardens the rear roof piece 31a may be removed by first lifting the end forms 91 and 93 and then lifting the roof piece 31 out from between the ridge form 90 and eave form 92.

Figure 21:
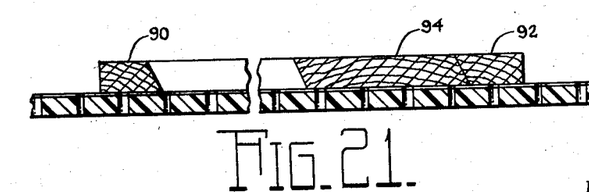
Fig. 21 is a view similar to Figs. 19 and 20 but taken along the line 21—21 of Fig. 18.

Pouring the back piece of the roof 30 is done in the same set of roof forms 90–93 but in this instance the gable forming insert 94 is positioned at the center and adjacent the eave form 92. The edge of the gable insert 94 which is adjacent the eave form 92 is beveled to fit into the undercut edge of the eave form 92 (Fig. 21) and its two other edges are similarly beveled so that beveled edges will be formed upon the gable opening in the roof piece 31.

Figure 22:
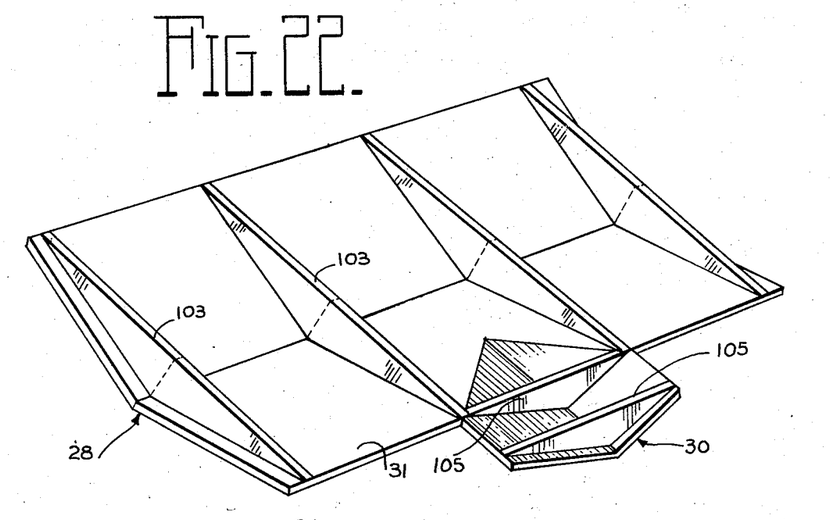
Fig. 22 is an inverted, isometric view showing the inner side of a roof for the house illustrated in Fig. 1 and constructed from roof members according to the invention.

Fig. 22 is an isometric view of a completed roof 30. The forms for pouring the two pieces making up the gable roof 30 are not disclosed in the drawings because they are substantially identical with the forms used for the pouring of the two portions of the main roof 28 with the exception, of course, of their particular dimensions.

Figure 23:
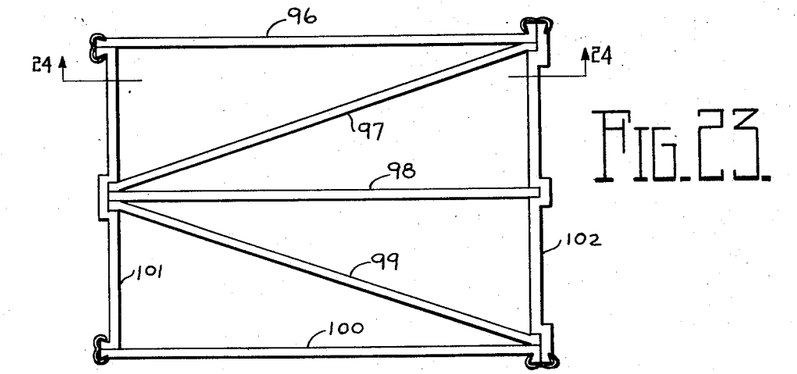
Fig. 23 is a plan view, on a smaller scale, of another group of roof pouring forms assembled to each other over a roof form plan on one or more of the construction bases, for the pouring or construction of roof bracing rafters.
Figure 24:
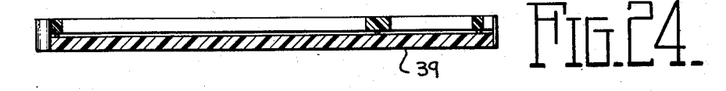
Fig. 24 is a vertical sectional view taken along the line 24—24 of Fig. 23.
Figure 25:
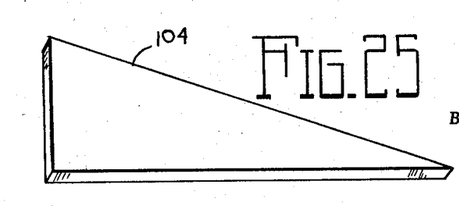
Fig. 25 is an isometric view of a roof brace poured in the forms illustrated in Figs. 23 and 24.

Fig. 23 is a plan view showing the arrangement of roof bracing rafter forms 96–102 which are placed upon a suitable plan upon the construction bases 39, for the pouring of a plurality of triangular roof bracing rafters 103 each of which consists of two smaller triangular elements 104 (see Fig. 25). The forms 96–102 are positioned on the construction bases 39 (see Fig. 24) by means of suitable positioning pins (not shown). As in the case of the main roof members 31 and 31a, the roof bracing rafters 104 are fabricated by pouring the cementitious material into the enclosures outlined by the forms 96–102, striking off their thickness by running a bar over the top of these forms and allowing the cementitious material to harden. In a similar manner, smaller triangular roof bracing rafters 105 are poured for the gable roof 30.

After all the roof sections and their bracing rafters 103 and 105 have hardened, they are assembled to each other with a suitable glue or cement in the relationship illustrated in Fig. 22. After this structure has hardened it is inverted and placed upon the previously poured and hardened walls and partitions of the house proper.

If desired, outhouses and accessory buildings such as the garage 36, sheds, barns, toolhouses, breezeways, and other buildings as well as smaller objects such as barbecue pits, swimming pools, etc., may also be poured through the use of suitable form elements with which a house construction set embodying the invention may be provided and according to floor plans or plans of other nature all of which are dimensioned upon the modular spacing established by the reticulated holes in the base plates 44.

After the structural members are completed suitable model windows and doors, not shown in the drawings and which may be of any conventional design, are inserted in the window and door openings formed by the window and door frames at the time of pouring of the house walls. The walls, doors, windows, roofs, etc. are painted with suitable colors and types of paint. If desired, in the more advanced or extensive construction kits embodying the invention, model windows and doors may be supplied in standard modular sizes and types, for example, being molded from various types of resins in selected colors. Additionally such kits may also include forms and plans for the pouring of sidewalks, driveways, details such as of chimneys, etc., to make the models even more realistic.

It is to be understood that this invention is not restricted in any way to a particular type of house or other building but is intended to embrace the concept of utilizing the pouring forms in the technique described as based upon a modular spacing system wherein accuracy of the spacing and assembly of the pouring forms is controlled by the use of construction bases having mounting plates suitably perforated according to the modular spacing.

I claim:

1. A construction kit for model buildings comprising modular wall forms having generally planar main faces of standard height and of widths which are multiples of each other, inside and outside corner forms having faces meeting at angles determined by the angles of intersection of the walls forming the corners and of the same standard height, all of said forms having cooperating vertical edge members, a plurality of resilient clips each cooperating with one of said vertical edge members on each of two adjacent ones of said forms for retaining adjacent forms in assembly, at least one construction base having a plurality of frame positioning holes therein arranged in an overall linear pattern, each of said forms having positioning pins adapted for insertion in the holes in said base when said forms are erected thereon in wall forming position, and a plan bearing a floor layout including positioning pin locations for superposition over said construction base for indicating those of said wall forms and corner forms necessary for constructing a specific building and for closing off those holes in said construction base not necessary for such wall and corner forms, whereby said wall and corner forms and said plan form closed bottom pouring forms for pouring the walls of the model building which is constructed from cementitious material.

2. A construction kit according to claim 1 in which the cooperating members on the vertical edges of said wall forms are outwardly extending flanges and said resilient clips embrace the flanges on adjacent ones of said forms.

3. A construction kit according to claim 2 in which each of said resilient clips has a longitudinal central ridge adapted to engage against the outer side of said flanges for aligning adjacent ones of said forms.

4. A construction kit according to claim 1 in which the holes in said construction base include interlineated series for intra-wall frames and said kit including intra-wall opening frames having peripheral members extending transversely between opposing ones of said wall forms and positioning pins adapted to fit into spaced ones of the interlineated holes in said construction base.

5. A construction kit according to claim 4 in which the wall opening frames have horizontally protruding elements on their outer sides for embedding in the material from which the walls are poured for retaining said wall opening frames in said walls when said wall forms are removed.

6. A construction kit according to claim 1 in which there are more than one of said construction bases and in which said construction bases are adapted to be locked in edge-to-edge co-planar juxtaposition and in which the plan extends over more than one of said construction bases, the holes in each of said construction bases being arranged in an overall reticulated pattern so spaced relative to the edges of said construction bases that the pattern continues between construction bases.

7. A construction kit according to claim 1 and including roof section pouring forms, said roof section pouring forms consisting of elongated cooperating roof edge forming members having positioning pins adapted to be inserted in spaced ones of the holes in said construction base, the inner edges of said roof pouring forms being beveled, whereby the edges of roof sections poured therein have complementary bevels for assembly to each other.

8. A construction kit according to claim 7 and including a roof section plan bearing a roof section layout including positioning pin locations for superposition over said construction base for indicating those of said roof pouring forms necessary for constructing a specific roof section and for closing off those holes in said construction base not necessary for positioning such roof section forms, whereby said roof section forms and said plan form bottom closed roof section pouring forms for pouring the roof sections of the model building which is constructed from cementitious material.

9. In a construction kit for model buildings having a plurality of modular wall forms having positioning pins and a construction base having an overall reticulated pattern of positioning pin holes upon which said forms are erected, the improvement comprising a floor plan consisting of a sheet of flexible, waterproof material bearing a floor plan from a specific building to be constructed, including wall form positioning pin locations, and overlying positioning pin holes in said construction base for sealing off such positioning pin holes and forming a bottom for a pouring form consisting of said wall forms and said plan.

10. A construction kit according to claim 9, in which said floor plan has pre-punched openings at said positioning pin locations adapted for positioning over said reticulated pattern of positioning pin holes in the construction base for the reception of form positioning pins on those wall forms outlined on said plan.

References Cited in the file of this patent

UNITED STATES PATENTS

| 1,935,542 | Bursell | Nov. 14, 1933 |
| 2,441,761 | Guelicher | May 18, 1948 |

FOREIGN PATENTS

| 338,412 | Germany | Mar. 25, 1919 |